United States Patent
Yang

(10) Patent No.: US 9,275,081 B2
(45) Date of Patent: Mar. 1, 2016

(54) DATA MANAGEMENT APPARATUS AND DATA MANAGEMENT METHOD

(71) Applicant: LG ELECTRONICS INC., Seoul (KR)

(72) Inventor: Inchang Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 13/857,210

(22) Filed: Apr. 5, 2013

(65) Prior Publication Data
US 2013/0268502 A1    Oct. 10, 2013

(30) Foreign Application Priority Data

Apr. 9, 2012  (KR) .................. 10-2012-0036891

(51) Int. Cl.
| | |
|---|---|
| G06F 17/30 | (2006.01) |
| H04N 7/18 | (2006.01) |
| H04N 19/503 | (2014.01) |
| H04N 19/61 | (2014.01) |
| H04N 19/593 | (2014.01) |
| H04N 19/107 | (2014.01) |
| H04N 19/132 | (2014.01) |
| H04N 19/137 | (2014.01) |
| H04N 19/169 | (2014.01) |

(52) U.S. Cl.
CPC ............ *G06F 17/3028* (2013.01); *H04N 7/181* (2013.01); *H04N 19/107* (2014.11); *H04N 19/132* (2014.11); *H04N 19/137* (2014.11); *H04N 19/188* (2014.11); *H04N 19/503* (2014.11); *H04N 19/593* (2014.11); *H04N 19/61* (2014.11)

(58) Field of Classification Search
CPC .................................................. G06F 17/3028
USPC ................ 707/693, 915; 382/236; 348/400.1, 348/403.1, 409.1, 420.1
See application file for complete search history.

(56) References Cited

U.S. PATENT DOCUMENTS

| | | | |
|---|---|---|---|
| 5,057,916 A | 10/1991 | Krause et al. ................. 358/105 |
| 6,169,821 B1* | 1/2001 | Fukunaga .......... H04N 21/4382 |
| | | | 375/E7.016 |
| 7,031,348 B1* | 4/2006 | Gazit ............... H04N 21/23406 |
| | | | 348/423.1 |
| 2006/0152636 A1* | 7/2006 | Matsukawa ...... G08B 13/19667 |
| | | | 348/715 |

(Continued)

FOREIGN PATENT DOCUMENTS

| | | |
|---|---|---|
| JP | 2007-068214 A | 3/2007 |
| WO | WO 2010/068600 A2 | 6/2010 |
| WO | WO2010068600 * | 6/2010 ............ H04W 28/02 |

OTHER PUBLICATIONS

European Search Report dated Jul. 15, 2013 issued in Application No. 13 00 1722.

*Primary Examiner* — Robert Beausoliel, Jr.
*Assistant Examiner* — Alexandria Bromell
(74) *Attorney, Agent, or Firm* — Ked & Associates, LLP

(57) ABSTRACT

A data management method is disclosed. The data management method includes receiving input image data including a plurality of frames, sorting a type of a frame included in the input image data, and erasing one or more I-frames among the plurality of frames included in the input image data or erasing at least a portion of data corresponding to the one or more I-frames among the plurality of frames included in the input image data. Thus, the data management method stores a low amount of image data in a limited storage space while minimizing loss of the image data, thereby effectively storing and managing data.

16 Claims, 9 Drawing Sheets

(56) References Cited

U.S. PATENT DOCUMENTS

| | | | | |
|---|---|---|---|---|
| 2006/0233201 A1* | 10/2006 | Wiesenthal | ........... | H04L 1/0014 370/477 |
| 2007/0058926 A1* | 3/2007 | Virdi | ...................... | H04N 5/783 386/231 |
| 2007/0106946 A1* | 5/2007 | Goetz | .................... | G06F 8/315 715/744 |
| 2007/0160038 A1* | 7/2007 | Liu | ........................ | H04N 7/163 370/389 |
| 2008/0063362 A1* | 3/2008 | Grigorian | ................ | H04N 5/76 386/326 |
| 2008/0086570 A1* | 4/2008 | Dey | .................... | H04N 21/2402 709/231 |
| 2012/0110062 A1* | 5/2012 | Savage | .................... | H04L 43/04 709/203 |
| 2012/0249593 A1* | 10/2012 | Nakagome | ........... | G06T 7/2053 345/634 |
| 2013/0268502 A1* | 10/2013 | Yang | ...................... | H04N 7/181 707/693 |

\* cited by examiner

DATA MANAGEMENT APPARATUS AND DATA MANAGEMENT METHOD

CROSS-REFERENCE TO RELATED APPLICATION

This application claims the priority benefit of Korean Patent Application No. 10-2012-0036891, filed on Apr. 9, 2012 in the Korean Intellectual Property Office, the disclosure of which is incorporated herein by reference.

BACKGROUND OF THE INVENTION

1. Field of the Invention

The present invention relates to a data management apparatus and a data management method, and more particularly to a data management method that stores a low amount of image data in a limited storage space while minimizing a loss of the image data, thereby effectively storing and managing data.

2. Description of the Related Art

By virtue of recent developments in various media devices, contents containing image data and use thereof have been remarkably increased. However, content storage spaces of houses, offices, and the like are limited. Thus, it is difficult to store and manage contents to be retained due to the insufficient storage space.

In addition, as surveillance cameras have entered widespread use, high-capacity surveillance cameras and video information captured by surveillance cameras cover many buildings and streets. The amount of such data is remarkably increased, and thus, it is difficult to store the data for several months. Accordingly, there is a need for a technology for degrading and storing data.

As a conventional technology, one frame is stored for one to several seconds among data of several tens of frames per second. However, a high-performance video compression technology used for surveillance cameras has already been developed, and thus, conventional technology is not very effective. In addition, when only one picture is stored for several seconds, it is highly possible that information between stored frames disappears and evidence admissibility of an image captured by a surveillance camera lapses.

SUMMARY OF THE INVENTION

Therefore, the present invention has been made in view of the above problems, and it is an object of the present invention to provide a data management method that stores a low amount of image data in a limited storage space while minimizing loss of the image data, thereby effectively storing and managing data.

In accordance with an aspect of the present invention, the above and other objects can be accomplished by the provision of a data management method including receiving input image data including a plurality of frames, sorting a type of a frame included in the input image data, and erasing one or more I-frames among the plurality of frames included in the input image data or erasing at least a portion of data corresponding to the one or more I-frames among the plurality of frames included in the input image data.

In accordance with another aspect of the present invention, there is provided a data management apparatus including an interface unit for receiving input image data including a plurality of frames, and a controller for sorting a type of a frame included in the input image data, wherein the controller controls to erase one or more I-frames among the plurality of frames included in the input image data or to erase at least a portion of data corresponding to the one or more I-frames among the plurality of frames included in the input image data.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

Throughout this specification, the suffixes "module" and "unit" are used simply for convenience of description, and do not have any special meaning or function. Thus, the suffixes "module" and "unit" may be used interchangeably.

Figure 1:
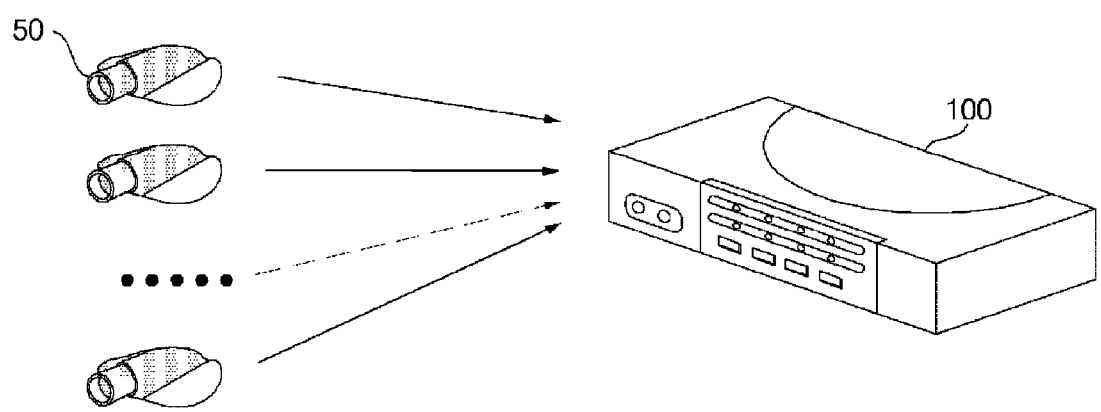
FIG. 1 is a diagram of a system including surveillance cameras and a storage device according to an embodiment of the present invention.
Figure 2:
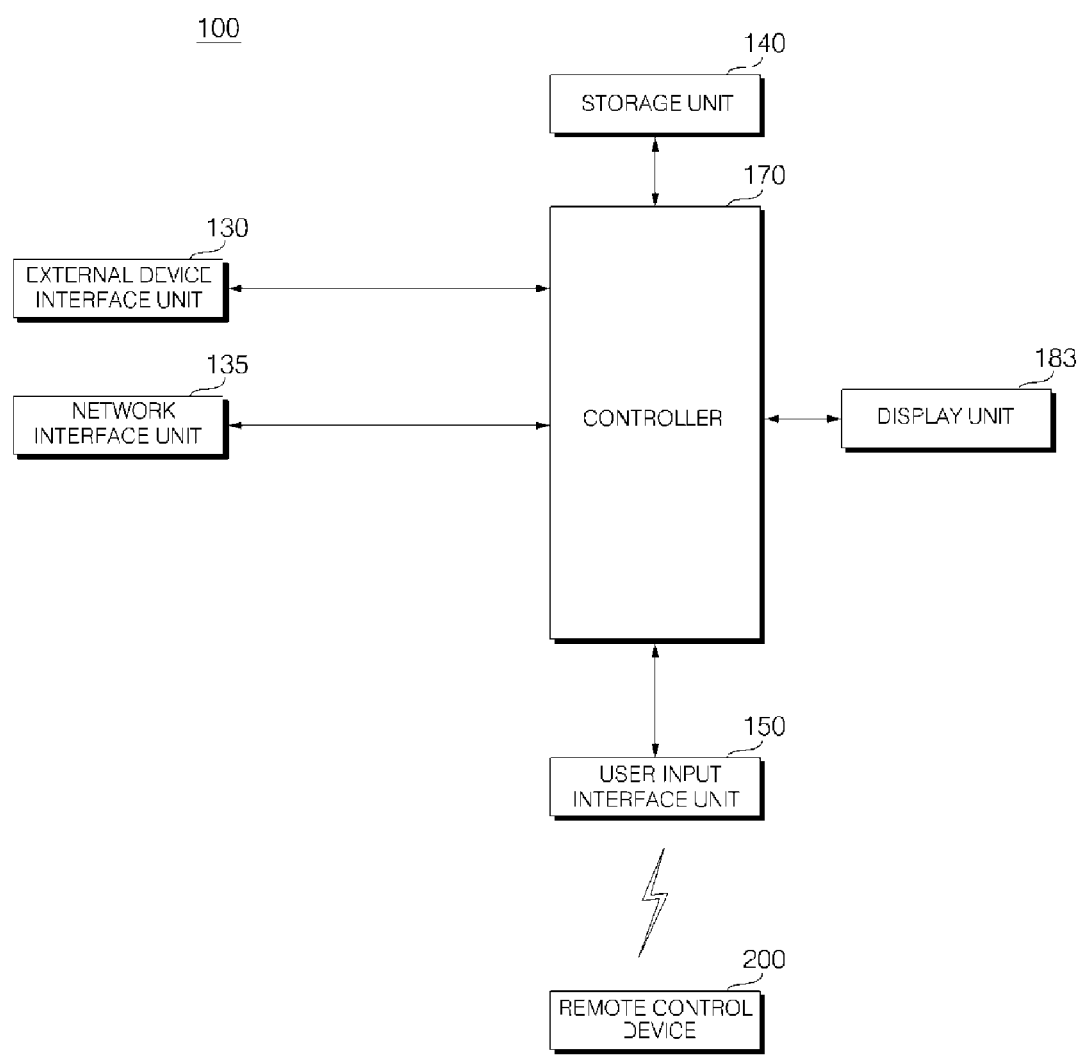
FIG. 2 is an internal block diagram of the storage device of FIG. 1.

FIG. 1 is a diagram of a system including surveillance cameras 50 and a storage device 100 according to an embodiment of the present invention and FIG. 2 is an internal block diagram of the storage device 100 of FIG. 1.

A data management apparatus according to an embodiment of the present invention may be a storage device including a memory or may control an external storage device connected to the data management apparatus to manage data. Hereinafter, the present invention will be described in terms of a case in which the data management apparatus is a storage device including a storage unit.

The storage device 100 may be a digital video recorder (DVR) or a network video recorder (NVR).

The DVR 100 may be connected to one or more surveillance cameras 50 and may be used.

In addition, when the surveillance cameras 50 are each an IP camera, the surveillance cameras 50 may be connected to the NVR 100 via a network and may be used.

The storage device 100 may output camera images received from the surveillance cameras 50 to a monitor connected to the storage device 100 and may separately display the camera images on a screen of the monitor. In addition, the storage device 100 may encode the camera images in an MPEG data stream or the like, and then may record and store, as an image data file, the camera images in the storage unit.

In addition, in order to transmit a captured video via the Internet network, the IP camera encodes and output the captured video in an MPEG data stream. Thus, the IP camera may decode an MPEG data stream of a camera image received from cameras and output the MPEG data stream of the camera image to a monitor connected to the IP camera to display the MPEG data stream of the camera image on a monitor screen. In addition, the IP camera may store image data.

The storage device 100 may additionally record a record time, camera information, or the like in the image data file, and thus, a user may view a desired image data file using the record time, the camera information, or the like.

Referring to FIG. 2, the storage device 100 according to the present embodiment may include an external device interface unit 130, a network interface unit 135, a storage unit 140, a user input interface unit 150, and a controller 170.

The external device interface unit 130 may transmit or receive data to or from an external device such as the surveillance camera 50 using a wired/wireless method. To this end, the external device interface unit 130 may include an audio/video (A/V) input and output unit (not shown).

The network interface unit 135 may provide an interface for connecting the storage device 100 to a wired/wireless network including the Internet network. For example, the network interface unit 135 may be connected to the surveillance camera 50 via a network and may receive image data from the surveillance camera 50. In addition, the network interface unit 135 may transmit or receive data to or from other external devices connected to the network interface unit 135 using a wired/wireless method, via a network.

The storage unit 140 may store programs for processing and control of signals, performed by the controller 170, and may store sound or data signals.

In addition, the storage unit 140 may store image data received through the external device interface unit 130 or the network interface unit 135.

The user input interface unit 150 may transmit a user input signal to the controller 170 or may transmit a signal from the controller 170 to the user.

For example, the user input interface unit 150 may transmit/receive a user input signal such as a power on/off signal, a selection signal, a setting signal, or the like from a remote control device 200.

The controller 170 may signal-process data input through the external device interface unit 130 or the network interface unit 135 to generate and output signals for output and storage of image and/or sound.

An image signal and sound signal that are processed by the controller 170 may be input to another electronic device through the external device interface unit 130 or the network interface unit 135.

In addition, the controller 170 may control an overall operation of a media reproduction apparatus, that is, the storage device 100.

The storage device 100 may be a monitor that is used in connection with another display device. In addition, the storage device 100 may further include a display unit 183 for output of an image.

Although not shown in FIG. 2, the controller 170 may include an inverse multiplexer, an audio processor, an image processor, a data processor, and the like.

The inverse multiplexer (not shown) inverse-multiplexes an input stream. For example, when an MPEG-2 TS is input to the inverse multiplexer, the inverse multiplexer may inverse multiplex the MPEG-2 TS to divide the MPEG-2 TS into image, sound, and data signals. Here, a stream signal input to the inverse multiplexer may be output from the external device interface unit 130 or the network interface unit 135.

The audio processor (not shown) may sound-process the inverse-multiplexed audio signal. To this end, the audio processor may include various decoders.

The image processor (not shown) may image-process the inverse-multiplexed image signal. To this end, the image processor (not shown) may include decoders of various standards, such as an image decoder.

The data processor (not shown) of the controller 170 may data-process the inverse-multiplexed data signal. For example, when the inverse-multiplexed data signal is an encoded data signal, the data processor may decode the data signal.

Figure 3:
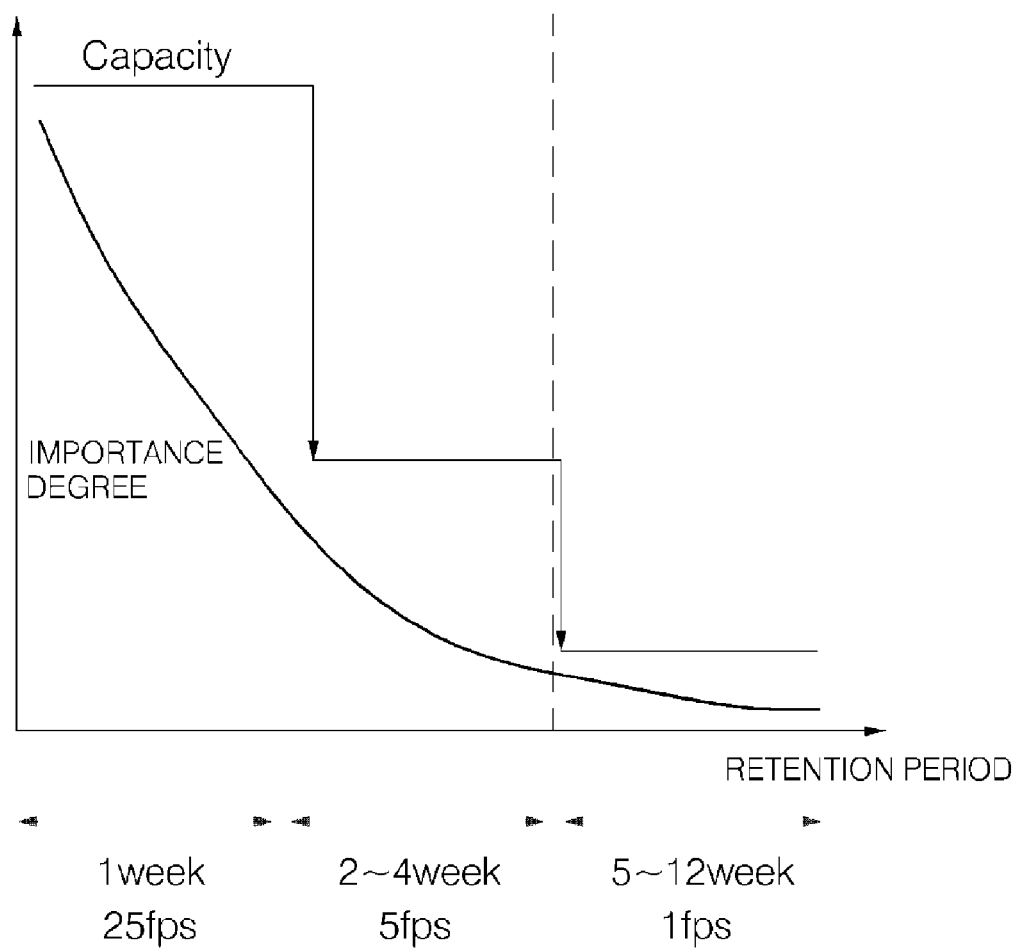
FIGS. 3 and 4 are reference diagrams for explaining a method of storing image data.
Figure 4:
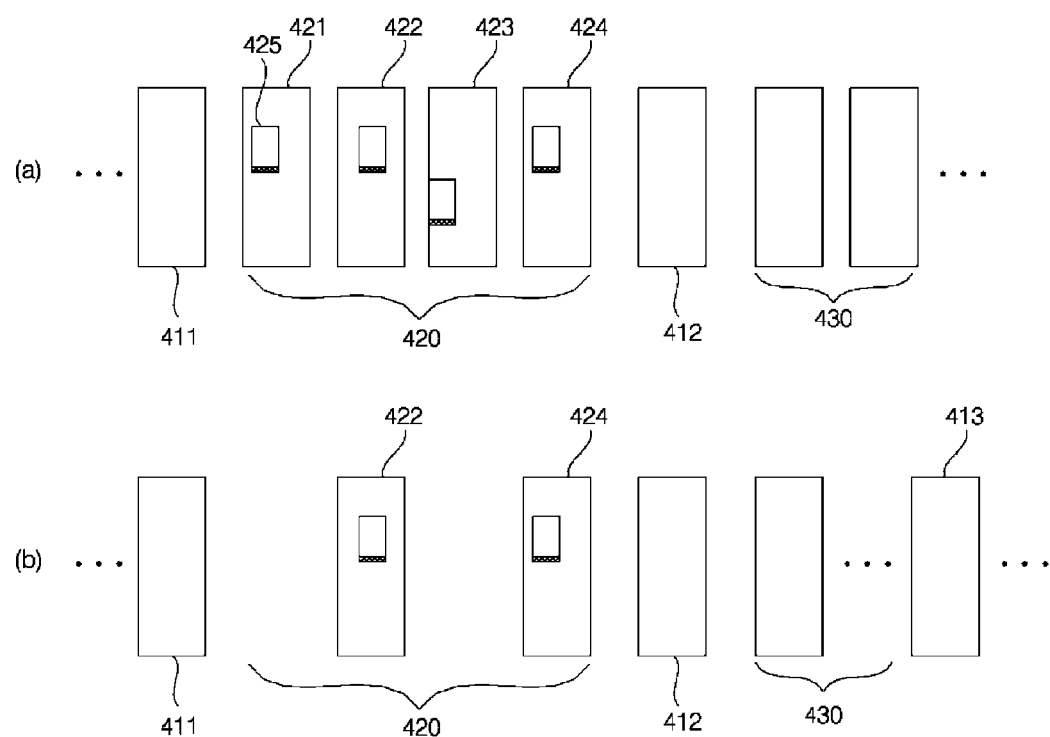

FIGS. 3 and 4 are reference diagrams for explaining a method of storing image data.

It is difficult to continually store and retain image data captured by many surveillance cameras due to a limited storage space.

For example, one camera stores data at about 100 KB to 1 MB per second. In this case, when it is assumed that 100 surveillance cameras are present, data is stored in a storage module at a maximum of 1 GB/s, occupying 1 TB per 1000 seconds, that is, 17 minutes. Even if the storage unit 140 includes numerous storage modules such as hard disks (HDDs) or the like, maintenance costs to store data for a period of one month or more are prohibitive.

In this case, image data may be stored at a reduced frame per second (FPS), and for example, the FPS may be changed to one frame per second from 30 frames per second, thereby reducing a data amount.

In addition, as shown in FIG. 3, an importance degree of stored data often gradually reduces over time, and thus, the FPS of the image data may be differentially changed according to time.

However, when the FPS is reduced, problems may arise in terms of a phenomenon in which image frames are often skipped.

One scene picture, that is, a still image based on time may be referred to as a frame or a slice. An image consecutively showing such frames over time may be referred to a moving picture (video). Thus, the video may include a plurality of frames.

The frame may include an intra-frame (I-frame) that is a basic frame for reproduction of a stream, a bi-direction frame (B-frame) reproduced in connection with the I-frame, and a predictive frame (P-frame).

There are various methods of increasing compression efficiency, for example, MPEG4, H.264, and the like.

A representative compression method of digital image data may store a new I-frame when an image with a large difference is input and then store a P-frame using a compression scheme for extending a recording time by storing an image frame in the I-frame using an entire image as one frame, comparing next input image frames with the I-frame, storing only the P-frame corresponding to a changed portion of the image frame, but not an unchanged image frame, and showing a combination of the I-frame and the P-frame during search of the image frames. Thus, many I-frames and P-frames may be stored according to a place or an environment.

In diagrams after FIG. 4, a box indicates a frame. In addition, with regard to a P-frame, a small box 425 inside the box indicates a differential image storing a difference with a previous image (frame). In addition, with regard to a B-frame, a small box indicates a differential image storing difference with a previous image (frame) or a next image (frame). When a differential image is generated via difference, motion prediction, and the like and is stored, compression efficiency is much higher than in a case in which all previous frames are stored.

With regard to an I-frame, compression may be performed using only space deduplication of the I-frame without time deduplication with a previous image and performed via pattern repetition, discrete cosine transform (DCT) of images, and the like.

FIG. 4 is a schematic diagram of a method of reducing the amount of image data by erasing some frames. In this case, erasure of I-frames 411 and 412 may influence subsequent image reproduction, and thus, some frames 422 and 424 of the P-frame or B-frame 420 and 430 may be retained and some frames 421 and 423 of the P-frame or B-frame 420 and 430 may be erased, as shown in FIG. 4(*b*), among received frames shown in FIG. 4(*a*), thereby reducing FPS and reducing a data amount. However, the amount of the P-frame or B-frame 420 and 430 is much smaller than the amount of the I-frames 411 and 412, and thus, erasing some frames of the P-frames or B-frames 420 and 430 is not highly conducive to the reduction in the data amount.

In other words, the method described with reference to FIG. 4 erases some differential frames, that is, the P frame or B-frame 420 or 430 via transcoding or without transcoding An image reconstructed via general video compression is very clean and is not degraded (some images may be degraded via video compression, but the reconstructed image is considered as not being degraded in that the reconstructed image indicates a compressed original image.). Thus, when data received from numerous surveillance cameras is stored, a storage space may be rapidly depleted.

When data with some degraded image is stored, if only I-frames are extracted without additional decoding or transcoding to reconstruct image data, the data amount may be reduced via frame degradation.

Referring back to FIG. 4(*b*), the P-frames or B-frames 421, 422, 423, or 424 may be erased such that the I frames 411 and 412 may be consecutively arranged.

Even in the above method, P and B frames are data from which redundant data is already erased. Thus, even if some P and B frames are erased in reality, about 10% efficiency may be obtained in general, and the data is already significantly compressed using a conventional video compression scheme (H.264, MPEG4, or the like), and thus, a significant effect may not be ensured.

In addition, many frames that highly influence a motion are erased. Thus, although an I-frame image provides a correct image, since an image in which many frames are skipped is displayed, excellent evidence admissibility may not be ensured in terms of surveillance.

Thus, the present invention provides a data management method for effectively storing and managing data by storing a large amount of image data in a limited storage space while minimizing degradation of image quality.

According to an embodiment of the present invention, a data management method may include receiving input image data including a plurality of frames, sorting a type of a frame included in the input image data, and erasing one or more I-frames among the plurality of frames included in the input image data or erasing at least a portion of data corresponding to the one or more I-frames among the plurality of frames included in the input image data.

Hereinafter, an embodiment of erasing one or more I-frames among the plurality of frames included in the input image data and an embodiment of erasing at least a portion of data corresponding to the one or more I-frames among the plurality of frames included in the input image data will be separately described in detail.

Figure 5:
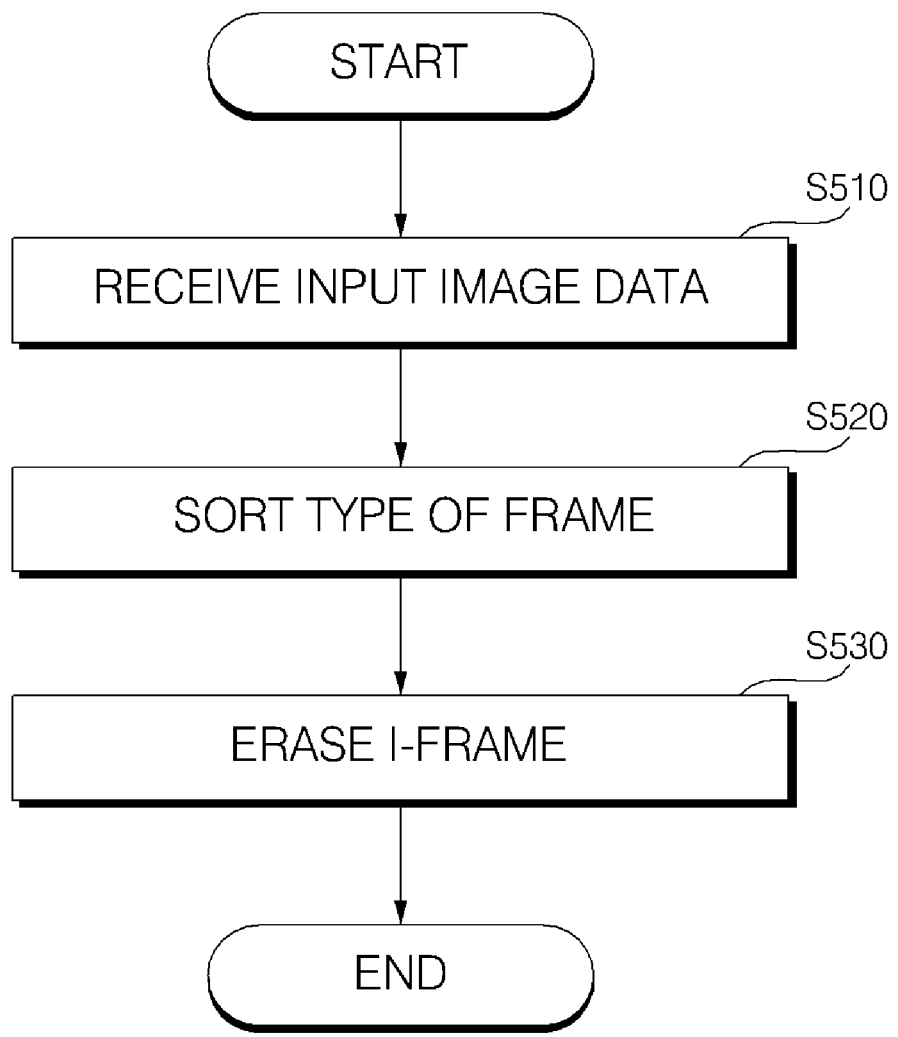
FIG. 5 is a flowchart of a data management method according to an embodiment of the present invention.
Figure 6:
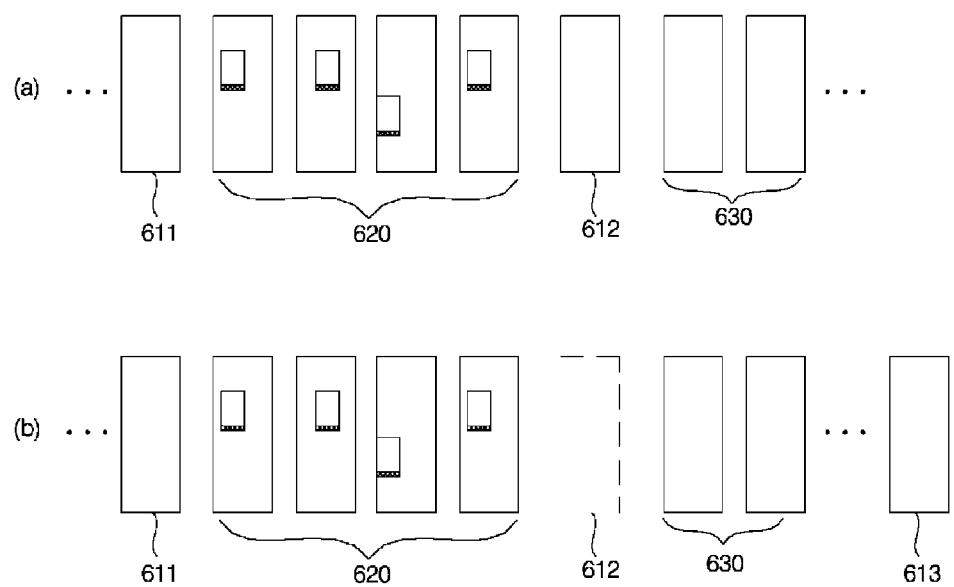
FIGS. 6 and 7 are reference diagrams for explaining the data management method of FIG. 5.
Figure 7:
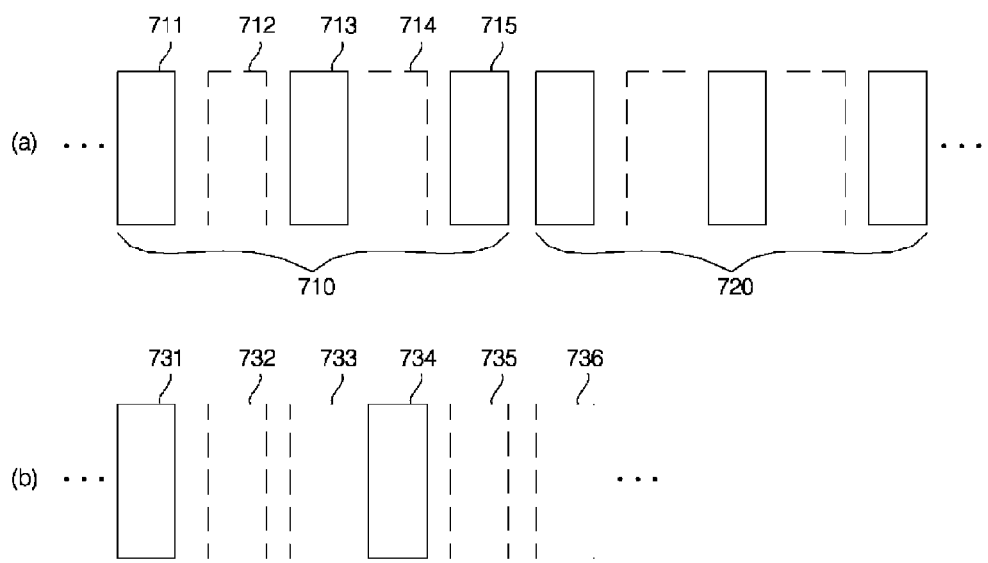

FIG. 5 is a flowchart of a data management method according to an embodiment of the present invention, and FIGS. 6 and 7 are reference diagrams for explaining the data management method of FIG. 5.

Referring to FIGS. 5 to 7, in the data management method according to the present embodiment, first, input image data including a plurality of frames is received (S510).

As described with reference to FIG. 2, the storage device 100 according to an embodiment of the present invention may receive the image data through the external device interface unit 130 or the network interface unit 135.

Throughout this specification, a case in which the storage device 100 including the storage unit 140 performs the data management method according to an embodiment of the present invention is described with regard to embodiments of the present invention, but a data management apparatus according the embodiments of the present invention is not limited thereto.

Then, the controller 170 sorts a type of a frame included in the input image frame (S520). The storage device 100 may sort the frame from a header contained in the input image data.

The controller 170 may sort types of frames, in particular, an I-frame, and then, may erase one or more I-frames among a plurality of frames included in the input image data (S530).

The data management method according to the present embodiment may further include storing remaining data of the input image data in the storage unit 140 or a separate storage medium.

Referring to FIG. 6, the storage device 100 sorts types of the plurality of frames included in the input image data into I-frames 611, 612, 613, . . . , and a P-frame or B-frame 620 or 630.

Then, the storage device 100 may erase at least one 612 among the I-frames 611, 612, 613, . . . . That is, the data management method is a method of regularly or irregularly erasing I-frames to store and restore an image using only a differential image and remaining I-frames.

Thus, only I-frames may be extracted and removed without additional decoding or transcoding. In this regard, when transcoding is performed, many system resources are consumed. Accordingly, when the amount of image data is reduced without transcoding, the system resources of a device may be effectively used.

When all I-frames are erased, there is a limit in decoding regions of an image, and thus, some I-frames are regularly or irregularly erased.

Here, the term 'regularly' means that several or several tens of I-frames are erased in a predetermined manner, for example, once every two frames or once every three frames in a sequence of the I-frames until only one I-frame remains.

Alternatively, the term 'regularly' means that several or several tens of I-frames are erased until a predetermined number of I-frames remain.

That is, in the erasing operation (S530), I-frames to be erased and the number of frames to be erased may be determined according to the sequence of the plurality of frames and may be changed according user settings and predetermined conditions.

For example, as shown in FIG. 7(*a*), two I-frames may be erased among five consecutive I-frames 710 and 710. A sequence of only the I-frames is determined and two I-frames 712 and 714 may be erased among the five consecutive I-frames 711, 712, 713, 714, and 715.

Alternatively, in the erasing operation (S530), I-frames may be erased at a predetermined period.

For example, as shown in FIG. 7(*b*), remaining I-frames 732, 733, 735, and 736 may be erased except for a first I-frame 731, 734 among three I-frames.

Referring back to the above-described method, for example, in the case of an image including 80% I-frames and 20% P-frames and B-frames, when frames are irregularly erased until only one frame remains among two I-frames, the data amount is reduced by about 60% of an original amount. That is, 40% reduction effect may be expected.

According to a conventional method in which only I-frames remain, only a 20% amount reduction effect may be expected.

Thus, the data management method according to the present embodiment may have very high efficiency.

In addition, the data management method according to the present embodiment is advantageous in that the number of skipped images is reduced because images are consecutively connected, compared with a conventional degradation method. A frame bit rate is reduced, but FPS is almost the same as in the conventional degradation method.

The term 'irregularly' means that the amount of I-frames to be erased is minimized in an image region with a high motion degree and the amount of erased I-frames to be erased is increased in an image region with a low motion degree. In addition, there may be a method of irregularly erasing I-frames according to another standard.

Whether a current image has a high or low motion degree may be determined from a case in which motion is captured from motion vectors of an image or the like or a case in which many frames with a large amount of differential data are present due to a high frame bit rate. When there is a high motion degree in an image, a difference between a current frame and a previous frame is increased, and thus, the number of P-frames and B-frames may be increased. Thus, when a rate of the P-frames or B-frames is high, a corresponding image may be estimated as a fast image.

That is, the data management method according to the present embodiment may further include determining a motion degree of the plurality of frames. In the erasing operation (S530), as the motion degree is reduced, more frames are erased than in a case of a high motion degree.

In addition, in the erasing operation (S530) of the data management method according to the present embodiment, more frames may be erased in a region with a low frame bit rate of the image data than a region with a high frame bit rate.

Among a plurality of image data that was recorded long before, image data with a low motion degree is preferentially and selectively erased, thereby preventing image data, which is important due to a high motion degree in spite of being recorded long before, from being inappropriately erased.

Figure 8:
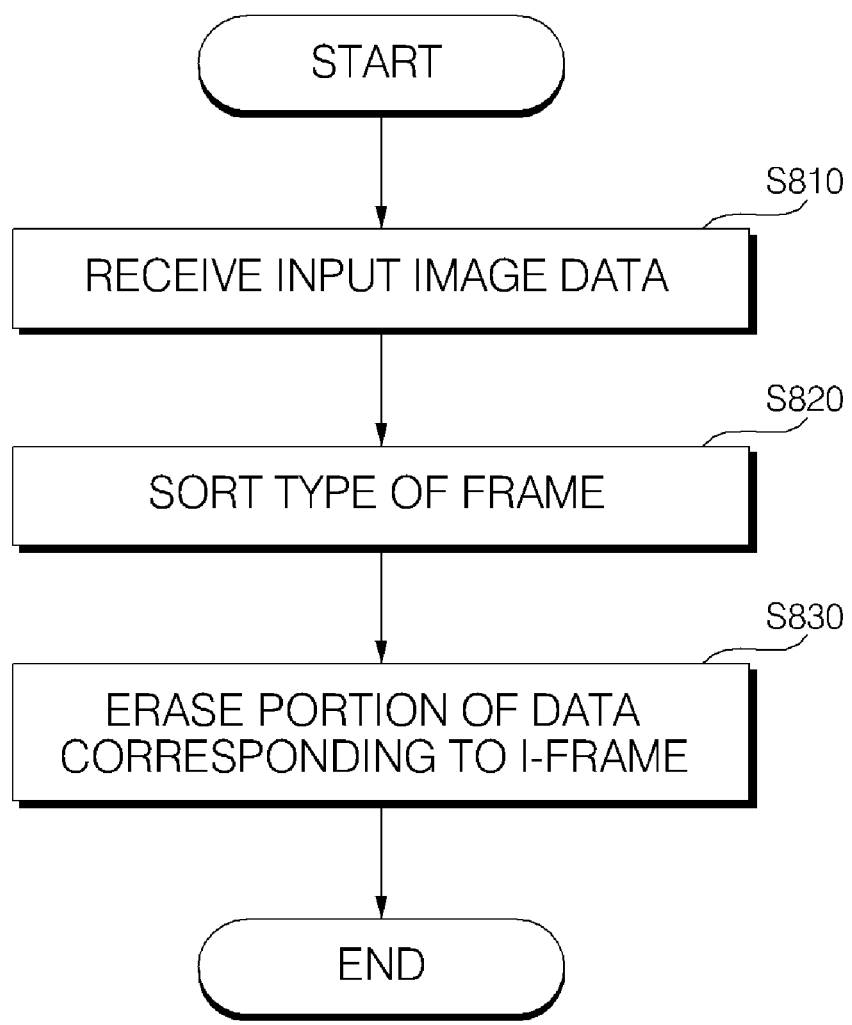
FIG. 8 is a flowchart of a data management method according to another embodiment of the present invention.
Figure 9:
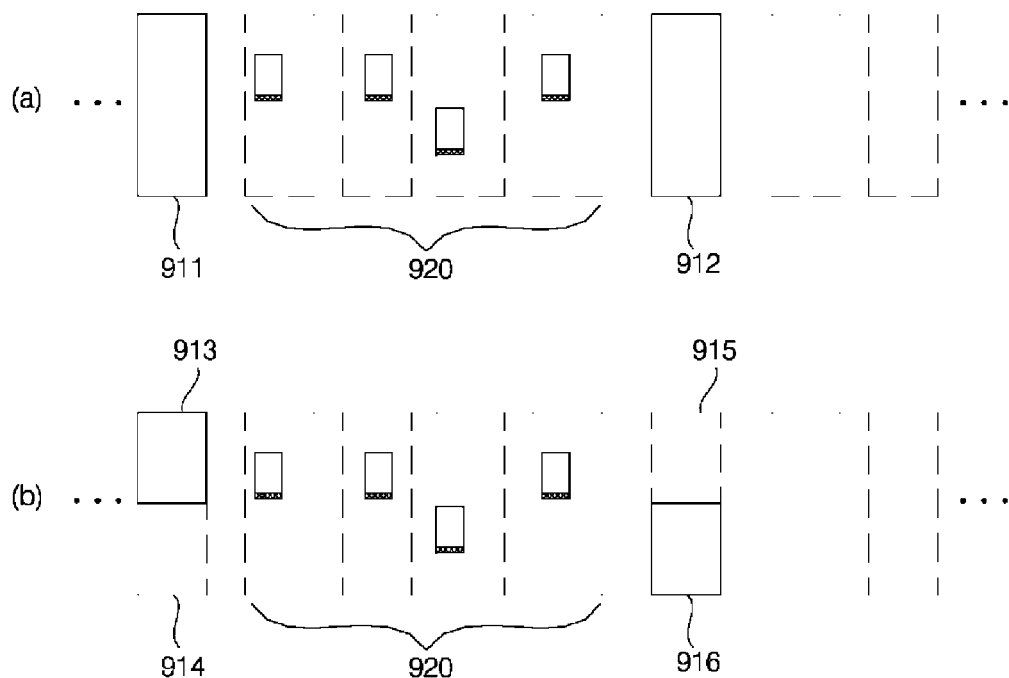
FIGS. 9 to 11 are reference diagrams for explaining the data management method of FIG. 8.
Figure 10:
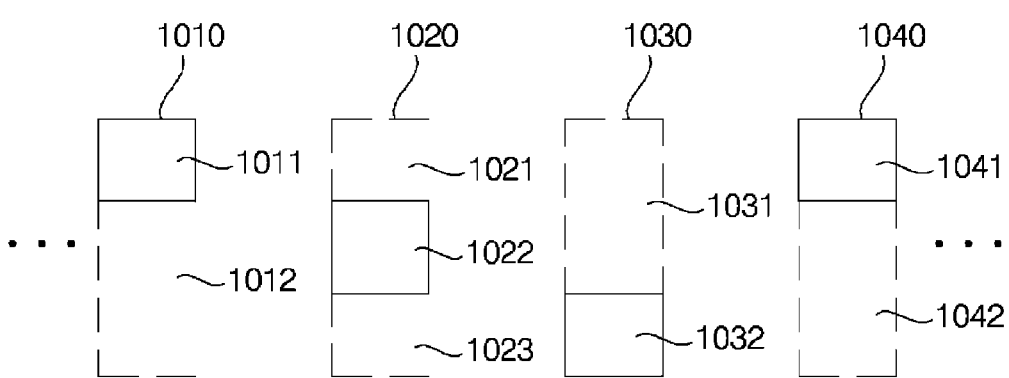
Figure 11:
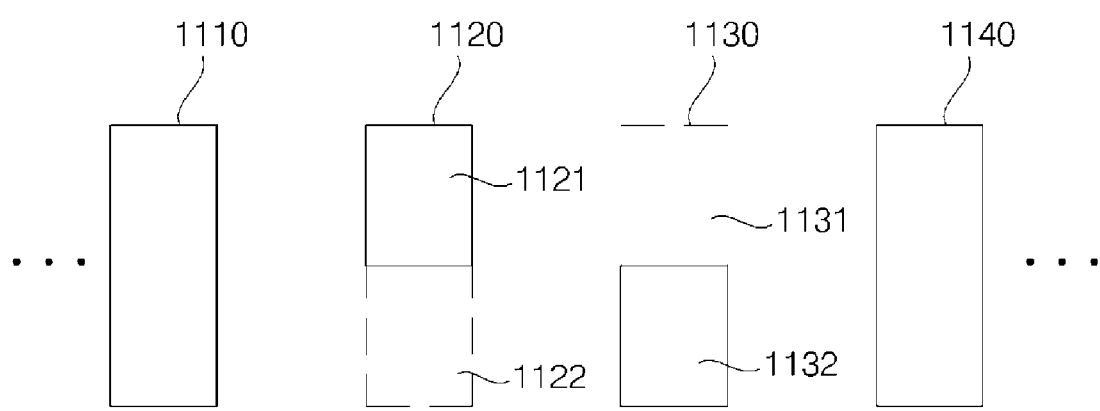

FIG. 8 is a flowchart of a data management method according to another embodiment of the present invention and FIGS. 9 to 11 are reference diagrams for explaining the data management method of FIG. 8.

Referring to FIGS. 8 to 11, the data management method according to the present embodiment may include receiving input image data including a plurality of frames (S810), sorting a type of a frame included in the input image data (S820), and erasing at least a portion of data corresponding to the one or more I-frames among the plurality of frames included in the input image data (S830).

That is, in the embodiment described with reference to FIGS. 5 through 7, entire data of an I-frame that is determined to be erased is erased. However, according to the present embodiment, a portion of data of an I-frame that is determined to be erased is erased.

Thus, the data management method according to the present embodiment may be performed similarly to the data management method described with reference to FIGS. 5 to 7, and may also be simultaneously performed with the data managing method described with reference to FIGS. 5 to 7.

That is, the controller 170 may erase entire data of some I-frames and erase a portion of data of other I-frames, among I-frames that are determined to be erased.

Thus, the data management method according to the present embodiment may further include storing remaining data of the input image data in the storage unit 140 or a separate storage medium.

In addition, in the erasing operation (S830), the controller 170 may determine I-frames, partial data of which is to be erased, and the number of frames, partial data of which is to be erased, according to a sequence of the plurality of I-frames. In addition, in the erasing operation (S830), a portion of data corresponding to the plurality of I-frames may be erased at a predetermined period.

In addition, the data management method according to the present embodiment may further include determining a motion degree of the plurality of frames. In the erasing operation (S830), the controller 170 may erase at least a portion of data corresponding to more frames as the motion degree is reduced, than in a case of a high motion degree.

In addition, in the erasing operation (S830), at least a portion of data corresponding to more frames may be erased in a region with a low frame bit rate of the image data than a region with a high frame bit rate.

In the erasing operation (S830), a portion of data corresponding to a first I-frame and second I-frame that are consecutively arranged is erased. In addition, an erased region of data corresponding to the first I-frame is different from an erased region of data corresponding to the second I-frame.

As shown in FIG. 9(a), I-frames 911, 921, . . . may be selectively determined from image data including the plurality of I-frames 911, 921, . . . and a P-frame or B-frame 920, frames which are subjected to erasure may be selected among the I-frames 911, 921, . . . , and then, a portion of data of the selected I-frames 911, 921, . . . may be erased.

Referring to FIG. 9(b), an upper region 913 of a first I-frame 911 remains and a lower region 914 is erased. In addition, a lower region 916 of a second I-frame 912 remains and an upper region 915 is erased.

In this case, the erased upper region 915 of the second I-frame 912 may correspond to a remaining region except for the erased region of data corresponding to the first I-frame 911, that is, the remaining upper region 913, thereby minimizing loss during image restoration.

As described above, only a portion of an I-frame is erased and is compensated for by a next I-frame. Likewise, I-frames are erased while generating a rule for compensation between two or more I-frames, thereby preventing an image from being seriously distorted.

Unlike a conventional method of degrading data while reducing FPS, when data is degraded by reducing only a bit rate while FPS is maintained, high storage efficiency and data continuity may be ensured, and thus, an evidential effect may be expected.

When data corresponding to different regions of three I-frames is erased, an erased region of a third I-frame subsequent to the second I-frame may be different from erased regions of data corresponding to the first and second I-frames.

Referring to FIG. 10, in first to third I-frames 1010, 1020, and 1030, data corresponding to different regions 1011, 1022, and 1032 may remain, and data corresponding to remaining regions 1012, 1021, 1023, ad 1031 may be erased.

Data may be regularly erased. For example, in a fourth I-frame 1040, a region 1042 corresponding to the erased region 1012 of the first I-frame 1010 may be erased and the remaining region 1041 may remain.

In addition, the above-described embodiments may be combined and implemented.

Referring to FIG. 11, the first and fourth I-frames 1110 and 1140 may remain, the second and third I-frames 1122 and 1131 may be erased, and remaining data 1121 and 1132 may remain. In addition, an entire portion of a next I-frame may be erased.

According to the embodiments of the present invention, when image data is input, data is extracted according to frames, and a type of a frame may be extracted without decoding the frame.

With regard to the determined I-frame, an erasing rule may be checked, and then, whether an entire portion of a frame is regularly or irregularly erased is determined. In the case of a partial erasing method, how to erase a portion may be determined, and then, a frame may be erased.

Then, predetermined next frames may be extracted, and then, the same method may be repeated.

Thus, a low amount of image data may be stored in a limited storage space while minimizing loss of the image data, and thus, data may be effectively stored and managed. In addition, data may be reconstructed to be close to an original image and to be normally reproduced when an erased region of each image is reconstructed.

The data management method and an apparatus using the same according to the foregoing embodiments are not restricted to the embodiments set forth herein. Therefore, variations and combinations of the exemplary embodiments set forth herein may fall within the scope of the present invention.

The data management method according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, and an optical data storage, and a carrier wave (e.g., data transmission over the Internet). The computer-readable recording medium can be distributed over a plurality of computer systems connected to a network so that computer-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data management method comprising:
receiving input image data comprising a plurality of frames;
sorting a type of a frame included in the input image data; and
erasing one or more I-frames while retaining P-frames and B-frames corresponding to the erased one or more I-frames among the plurality of frames included in the input image data or erasing at least a portion of data corresponding to the one or more I-frames while retaining P-frames and B-frames corresponding to the one or more I-frames which are erased at least the portion of data among the plurality of frames included in the input image data,
wherein the erasing comprises erasing a portion of data corresponding to a consecutively arranged first I-frame and second I-frame, wherein an erased region of data corresponding to the first I-frame is different from an erased region of data corresponding to the second I-frame, and
wherein the erased region of the data corresponding to the second I-frame corresponds to a non-erased region of the data corresponding to the first I-frame.

2. The data management method according to claim 1, further comprising storing remaining data of the input image data.

3. The data management method according to claim 1, wherein the erasing comprises determining I-frames to be erased and the number of frames to be erased, according to a sequence of the plurality of frames.

4. The data management method according to claim 1, wherein the erasing comprises erasing I-frames at a predetermined period.

5. The data management method according to claim 1, further comprising determining a motion degree of the plurality of frames,
wherein the erasing comprises erasing more frames as the motion degree is reduced, than in a case of a high motion degree.

6. The data management method according to claim 1, wherein the erasing comprises erasing more frames in region with a low frame bit rate of the image data than a region with a high frame bit rate.

7. The data management method according to claim 1, wherein an erased region of a third I-frame subsequent to the second I-frame is different from the erased regions of the data corresponding to the first and second I-frames.

8. The data management method according to claim 1, wherein the erasing comprises determining I-frames with partial data being erased and the number of frames with partial data being erased, according to a sequence of the plurality of I-frames.

9. The data management method according to claim 1, wherein the erasing comprises erasing a portion of data corresponding to a plurality of I-frames at a predetermined period.

10. The data management method according to claim 1, further comprising determining a motion degree of the plurality of frames,
wherein the erasing comprises erasing a portion of data corresponding to more frames as the motion degree is reduced, than in a case of a high motion degree.

11. The data management method according to claim 1, wherein the erasing comprises erasing a portion of data corresponding to more frames in region with a low frame bit rate of the image data than a region with a high frame bit rate.

12. A data management apparatus comprising:
an interface device for receiving input image data comprising a plurality of frames; and
a controller for sorting a type of a frame included in the input image data,
wherein the controller controls to erase one or more I-frames while retaining P-frames and B-frames corresponding to the erased one or more I-frames among the plurality of frames included in the input image data or to erase at least a portion of data corresponding to the one or more I-frames while retaining P-frames and B-frames corresponding to the one or more I-frames which are erased at least the portion of data among the plurality of frames included in the input image data,
wherein the controller controls to erase a portion of data corresponding to a consecutively arranged first I-frame and second I-frame, wherein an erased region of data corresponding to the first I-frame is different from an erased region of data corresponding to the second I-frame, and wherein the erased region of the data corresponding to the second I-frame corresponds to a non-erased region of the data corresponding to the first I-frame.

13. The data management apparatus according to claim 12, further comprising a storage unit for storing remaining data of the input image data.

14. The data management apparatus according to claim 12, wherein the controller determines I-frames to be erased and the number of frames to be erased, according to a sequence of the plurality of frames.

15. The data management apparatus according to claim 12, wherein the controller controls to erase I-frames at a predetermined period.

16. The data management apparatus according to claim 12, wherein the controller determines a motion degree of the plurality of frames, and erases a portion of data corresponding to more frames as the motion degree is reduced, than in a case of a high motion degree.

* * * * *